L. Finger,
Filtering Faucet.
Nº 13,836. Fig. 1.  Patented Nov. 20, 1855.
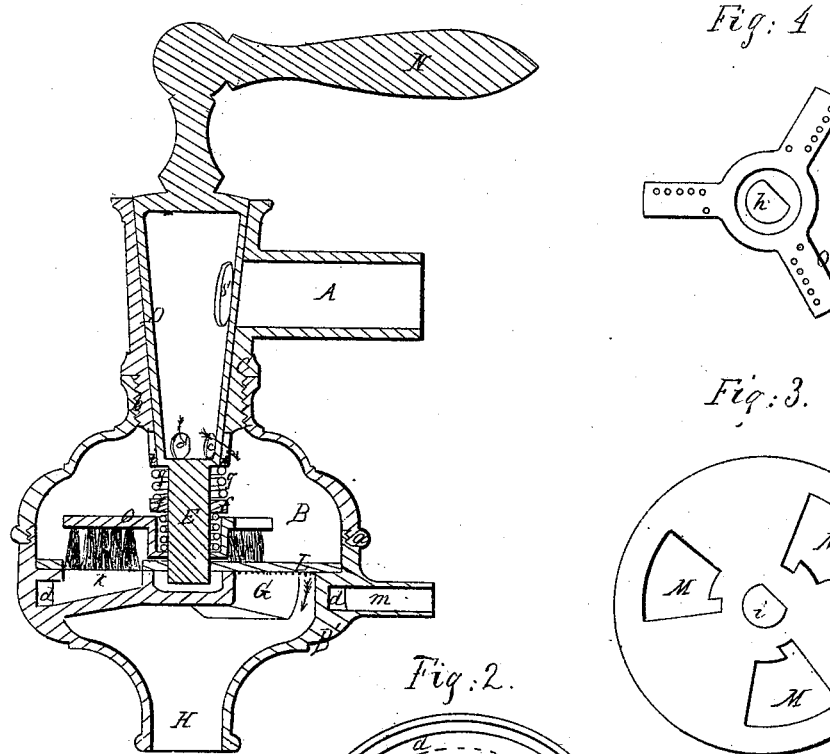
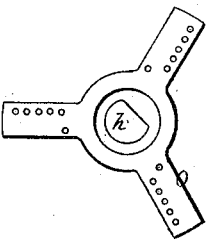
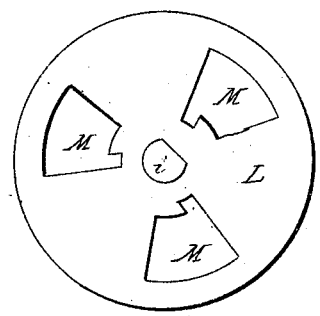
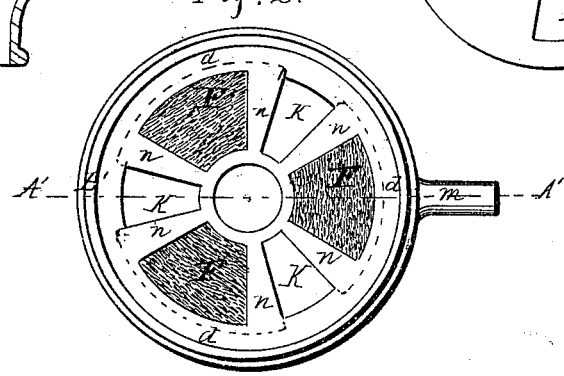

UNITED STATES PATENT OFFICE.

LOUIS FINGER, OF BOSTON, MASSACHUSETTS, ASSIGNOR TO L. FINGER AND L. SCHELL.

FILTERING-FAUCET.

Specification of Letters Patent No. 13,836, dated November 20, 1855.

*To all whom it may concern:*

Be it known that I, LOUIS FINGER, of Boston, in the county of Suffolk and State of Massachusetts, have invented certain new and useful Improvements in Water-Filters, of which the following is a full, clear, and exact description, reference being had to the annexed drawings, making part of this specification, in which—

Figure 1, is a vertical section through the center of the filter upon the line A' A', of Fig. 2; Fig. 2, a plan of the lower partition thereof: Figs. 3 and 4, details which will be referred to hereafter.

In cities which are supplied with river or lake water or even where rain water is employed for culinary or drinking purposes, it becomes necessary to filter the water as it is drawn from the cock, and various expedients have been resorted to for the purpose of removing the sediment deposited upon the surface of the filter.

To accomplish this end more effectually than has heretofore been done and to remove all organic matter from the filter so soon as it enters therein is the object of my present invention, which consists in the adaptation of a brush to the surface of the filter, which it is made to traverse each time the cock is opened or closed, in combination with a secondary water passage through which the matter that is brushed from the surface of the filter is permitted to pass with a small portion of the water that enters the body of the filter from the cock.

To enable others skilled in the art, to understand my invention I will proceed to describe the manner in which I have carried it out.

In the accompanying drawings A, is the water pipe; B B', the filter which is composed of two parts united by a screw at *a*.

C, is the cock; D, the plug through which the water is admitted by the holes *c* to the filter. From the bottom of this plug projects the rod E, to which is secured the collar *f*. The spring *g* bears upon this collar and also upon the ring or band *i*, projecting down from the body of the cock, by which means the plug at the cock is retained in place. The filtering medium is contained in the lower half of the filter, and consists in the present instance of disks of wire gauze, F, covering openings to passages G, which lead directly to the delivery nozzle H.

Between the opening covered by the wire gauze F, are other openings K, which communicate with the annular passage *d*, which terminates in the drip pipe *m*, from which passes any water that may enter the openings K. The passages for the conveyance of the filtered water are separated from those which lead to the drip pipe *m* by the partition *n*, upon the top surface of which rests the disk or cone L. This disk has three openings M, corresponding to the filters F, so arranged that when the plate is revolved so as to bring its openings M, over the filters, the passages K, shall be entirely closed. Immediately over the disk L, and projecting through the openings therein is a three armed brush O, which rests upon the surface of the filter down upon which it is held by the spring *p* which bears upon the under surface of the collar *f*. The rod E, passes through openings *h* and *i*, in the center of the brush and disk by which means they are caused to revolve as the plug is turned by handle N.

Operation: The parts being arranged as seen in Fig. 1, the plug is revolved until the opening S, in the plug is opposite to the inlet pipe A and the water flows through the openings C, into the upper chamber of the filter, when the parts are in this position the passages K, are covered by the disk L, and no water can escape through the drip pipe *m*. When the handle is again turned in either direction the water is shut off and at the same time the brushes are passed over the surface of the filters, and the passages K are opened. The sediment which may have been deposited upon the surface of the filter is thus brushed off and together with the small quantity of water which remains in the upper chamber of the filter passes off through the channel *d*, and drip pipe *m*. The filter is thus cleansed each time it is used and all organic matter which may be deposited thereon is immediately removed and not suffered to putrify in contact with the water as is the case with all other filters with which I am acquainted.

What I claim as my invention and desire to secure by Letters Patent is—

The brush O, in combination with the plate L, and passages K, operating in the manner and for the purpose substantially as herein set forth.

LOUIS FINGER.

Witnesses:
SAM. COOPER,
H. B. OSGOOD.